United States Patent [19]
Baek

[11] Patent Number: 5,963,868
[45] Date of Patent: Oct. 5, 1999

[54] TRANSMISSION CONTROLLER FOR TRANSMITTERS IN BASE STATION FOR MOBILE TELECOMMUNICATION SYSTEM

[75] Inventor: Il-Seob Baek, Seoul, Rep. of Korea

[73] Assignee: SamSung Electronics Co., Ltd., Kyungki-do, Rep. of Korea

[21] Appl. No.: 08/831,982

[22] Filed: Apr. 2, 1997

[30] Foreign Application Priority Data

Apr. 2, 1996 [KR] Rep. of Korea .......................... 96-9909

[51] Int. Cl.[6] .................................................. H04B 15/00
[52] U.S. Cl. .......................... 455/503; 455/31.2; 455/426; 340/825.44
[58] Field of Search .................................... 455/458, 502, 455/503, 31.1, 31.2, 31.3, 426, 456, 524; 340/825.44; 375/356; 370/503

[56] References Cited

U.S. PATENT DOCUMENTS

| | | | |
|---|---|---|---|
| 4,696,051 | 9/1987 | Breeden | 455/503 |
| 5,014,344 | 5/1991 | Goldberg | 455/503 |
| 5,261,118 | 11/1993 | Vanderspool, II et al. | 455/503 |
| 5,355,529 | 10/1994 | Linquist et al. | |
| 5,361,398 | 11/1994 | Christian et al. | 455/503 |
| 5,365,569 | 11/1994 | Witsaman et al. | |
| 5,416,808 | 5/1995 | Witsaman et al. | 455/503 |
| 5,455,965 | 10/1995 | Shaughnessy et al. | 455/503 |
| 5,483,665 | 1/1996 | Linquist et al. | 455/503 |
| 5,734,985 | 3/1998 | Ito et al. | 455/503 |

Primary Examiner—Dwayne D. Bost
Assistant Examiner—Quochien B. Vuong
Attorney, Agent, or Firm—Robert E. Bushnell, Esq.

[57] ABSTRACT

A simulcasting transmitter control apparatus in a base station of a mobile telecommunication system controls the output timing of transmitters so as to achieve a simulcasting of their outputs in the same channel. The control apparatus including: a unit for inputting control data form a base station control unit, a unit for generating a reference clock, a unit for generating delayed clocks divided from the reference clock, and a delay unit for receiving the control data, setting each delay time period in accordance with the control data, and delaying outputting of paging data from the transmitter by the delay time period in synchronization with the delayed clocks. The delay time period of the delay unit according to the respective control data compensates for the delay characteristic of the transmitters. The simulcasting of the radio frequency signals of the same channel in a reiteration cell area is carried out in the present invention.

8 Claims, 7 Drawing Sheets

TRANSMISSION CONTROLLER FOR TRANSMITTERS IN BASE STATION FOR MOBILE TELECOMMUNICATION SYSTEM

CLAIM OF PRIORITY

This application makes reference to, incorporates the same herein, and claims all benefits accruing under 35 U.S.C §119 from an application entitled Transmission Controller For Transmitters In Base Station For Mobile Telecommunication System earlier filed in the Korean Industrial Property Office on Apr. 2, 1996, and there duly assigned Ser. No. 96-9909 by that Office.

BACKGROUND OF THE INVENTION

1. Field of the Invention

The present invention relates to a radio signal transmission in a cellular base station for a mobile telecommunication system and, more particularly, to a transmission controller for use in the base station capable of simultaneously controlling a multiplicity of radio transmitting signals of the same channel upon transmission.

2. Description of the Related Art

In general, a service area for a mobile telecommunication system is split into a given number of plurality of local sites each provided with a plurality of transmitters in its respective base station for transmitting the radio signals to its subscribers' terminal equipments which are scatteredly located and movable in a very wide area. These transmitters each serve as a kind of interfacing unit of the radio signals in between a central telecommunication system and its subscribers' terminal equipments in every local site via a corresponding base station. Hereinbelow, the mobile telecommunication system is referred to and assumed for instance as a "paging system" for the purpose of better explanation in the present invention.

In a conventional paging system a paging signal is generated by a dialling operation of a telephone subscriber by dialing a predetermined paging number of a desired paging receiver in order to page a given subscriber. The paging signal is then provided to an exchange system which analyzes the paging signal and, if the result of analysis should indicate that a paging receiver is being called, the the paging signal is transmitted to a paging system. The paging system receives the paging signal converts it into a CAP code that is a kind of address codeword for a paging receiver, and transmits the CAP code using POCSAG coding to a transmitter which receives the POCSAG data and converts it into a radio signal for transmission.

The paging system provides a radio paging service for every paging subscriber located within a serviceable area delimited by a plurality of operating cell sites or base stations having a plurality of transmitters. Accordingly, the above-mentioned radio telecommunication system often causes the occurrence of a reiteration cell, that is, an overlapped cell area for the same radio signal between adjacent cell sites, in which case any paging receiver located in such a reiterated cell area may not be provided with the better quality of service of one of the cells. The transmitters are connected with the paging system by a wire or cable, in which a length of each wire or cable is dependent upon the distance between the respective transmitters and the paging system. Therefore, even though each site transmits the same channel of data, the paging signal in the reiterated area is considerably affected by air delay and/or line delay, thereby leading to loss of timing upon transmission of those radio signals, which usually results in a damaged paging signal. The line delay or air delay often causes two adjacent base stations to transmit identical channel data at different times, which makes it substantially impossible to provide an acceptable quality of paging service for any paging receiver located in such a reiterated cell area. For instance, a paging receiver located in the reiterated cell area may fail to receive the paging signal or may receive the same twice successively.

One of the solutions for the above problem in the paging receiver is to use a so-called simulcasting through a kind of controlled line between the corresponding transmitters of associated base stations and paging terminals, which simulcasting functions to transmit a multiplicity of paging data simultaneously by making the starting times of data transmission in those transmitters having the same channel of data in the respective base stations coinside. This method of simulcasting of the paging data provides a better quality of paging service even for paging receivers located in those reiteration cells. U.S. Pat. No. 5,355,529 to Roger D. Linquist, et al., entitled Paging System With Satellite Time Base and U.S. Pat. No. 5,365,569 to Mark L. Witsaman, et al., Entitled Digital Simulcast Transmission System are two example of known simulcast systems and are incorporated

SUMMARY OF THE INVENTION

It is an object of the present invention to provide a transmission controller capable of effectively controlling the transmission timing of transmitters with the same channel so as to achieve a simulcasting of the transmition outputs of those transmitters in the same channel in a mobile telecommunication system.

It is another object to provide a transmission controller capable of providing a better quality of paging service even in a reiteration (overlapping) cell in a paging system by appropriately compensating for any output delay of the paging data in accordance with a delay characteristic of each transmitter, thereby simulcasting the paging data outputs of the transmitters in the same channel.

These and other objects can be achieved according to the present invention which provides a simulcasting transmitter control apparatus in a base station of a mobile telecommunication system, the base station being provided with a plurality of transmitters each having its own delay characteristic including a line or air delay and with a base station control unit providing a set of control data, the control data being usable in simulcasting of a multiplicity of radio frequency signals of the same channel in a reiteration cell area, the simulcasting transmitter control apparatus including: a unit for inputting the control data; a unit for generating a reference clock; a unit for generating a plurality of delayed clocks divided from the reference clock; and a delay unit for receiving the control data, setting a respective delay time period in accordance with the control data, and delaying outputting of paging data from the transmitter of the base station by the corresponding delay time period in synchronization with the delayed clocks, so that the simulcasting of the multiplicity of radio frequency signals of the same channel in the reiteration cell area is carried out in the plurality of transmitters.

The simulcasting transmitter control apparatus according to the present invention further includes a controller for controlling the entire operation of the transmitters, receiving the control data from the control unit of the base station, and therefrom generating a control signal to control the time delay for the outputs of the respective transmitter. The delay time period of the delay unit compensates for the delay characteristic of the transmitters.

The simulcasting transmitter control apparatus according to the present invention further includes an interfacing unit provided with a delaying circuit unit for delaying transmission of the paging data received thereto responsive to the control signal from the controller.

The simulcasting transmitter control apparatus according to the present invention still further includes a frequency modulation unit coupled to the interfacing unit, for modulating the delayed paging signal under control of the controller.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements devices, and wherein.

DETAILED DESCRIPTION OF THE PREFERRED EMBODIMENTS

Hereinafter, the preferred embodiment of the present invention will be described in detail with reference to the accompanying drawings.

Figure 1:
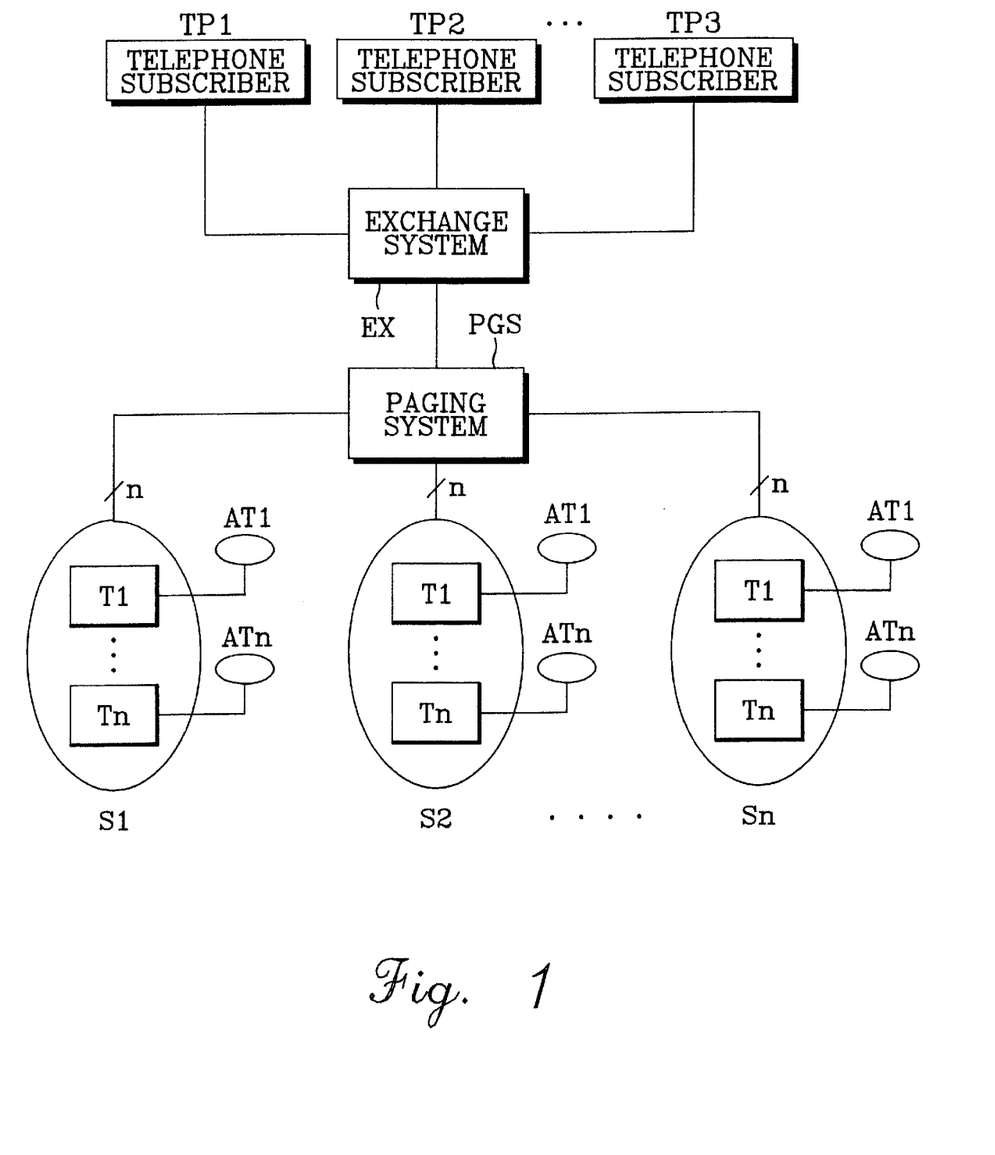
FIG. 1 is a schematic block diagram representative of a summarized construction of a mobile telecommunication system, for example, a paging system applicable in the present invention.

Referring now to FIG. 1, there is illustrated a summarized construction of a paging system applicable in the present invention, in which system a paging signal is generated by a dialling operation of telephone subscribers TP1–TPn, who dial a predetermined paging number of a desired paging receiver (not shown) in order to page a given subscriber. The dialing data is then provided to an exchange system EX as a paging signal, which consequently analyzes the received dialling data and, if the result of analysis indicates that the dialling data is indicative of a call to a paging receiver, exchange system EX transmits the paging signal to a paging system PGS. Paging system PGS receives the dialling data as a paging signal converts the dialling data into a CAP code that is an address codeword for a paging receiver, and transmits the CAP code in POCSAG coding to each transmitter T1–Tn located in each cell sites S1–Sn, which transmitters each convert the received POCSAG data into a radio signal for transmission via antennas AT1–ATn.

Figure 2:
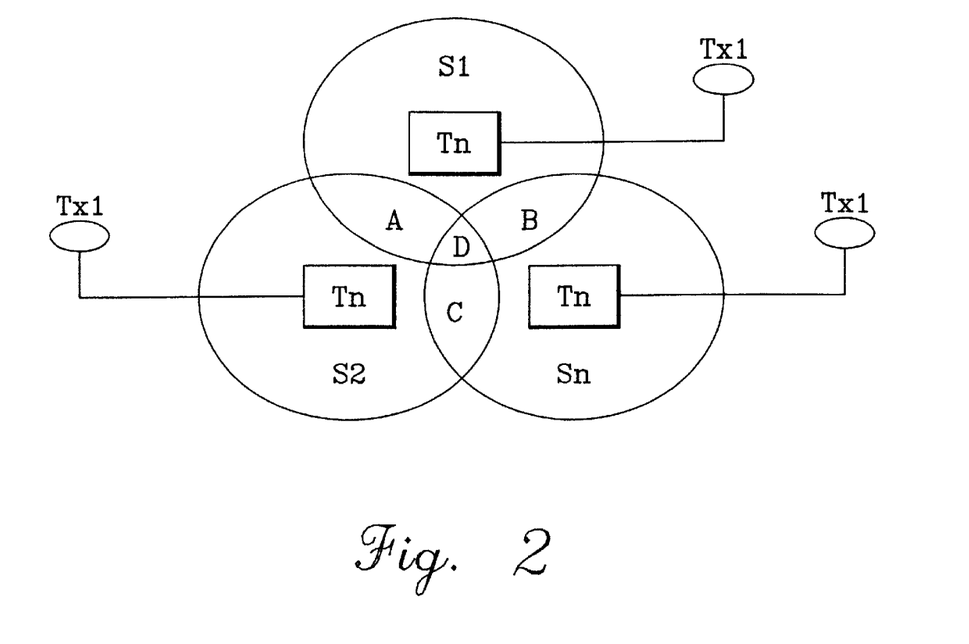
FIG. 2 is a schematic diagram illustrating the cell overlapping between base stations in the mobile telecommunication system of FIG. 1.

In order to provide adequate coverage of an area serviced by the paging system, the cell sites of the paging system as set forth in FIG. 1 will overlap as shown in FIG. 2 so that there are no gaps in the coverage area. FIG. 2 is a schematic diagram illustrating the overlapping of cells for the paging signals between adjacent sites of base stations, that is, the reiteration cell area in the paging system having the construction as set forth in FIG. 1, wherein an area "A" denotes a reiteration cell area between paging data transmitted from a transmitter Tn of a base station S1 and other paging data transmitted from other transmitter Tn of a base station S2, an area "B" denotes another reiteration cell area between paging data transmitted from a transmitter Tn of a base station S1 and other paging data transmitted from other transmitter Tn of a base station Sn, an area "C" denotes another reiteration cell area between paging data transmitted from a transmitter Tn of a base station S2 and other paging data transmitted from other transmitter Tn of a base station Sn, and an area "D" denotes the other reiteration cell area in between paging data transmitted from the respective transmitters Tn of the above three base stations S1, S2 and Sn.

A line delay of a transmission cable, or an air delay in a radio link, would normally cause two adjacent base stations, for example, S1 and S2 to transmit identical data of a data channel at different times, which causes a reception error in a paging receiver located in such reiterated cell areas as "A" and "D". For example, a paging receiver located in the reiterated cell area "A" may fail to receive the paging signal or may receive the same twice successively. This phenomenon would occur in a like manner in all of those areas A, B and C, and even more frequently in the tripled area D.

Figure 3:
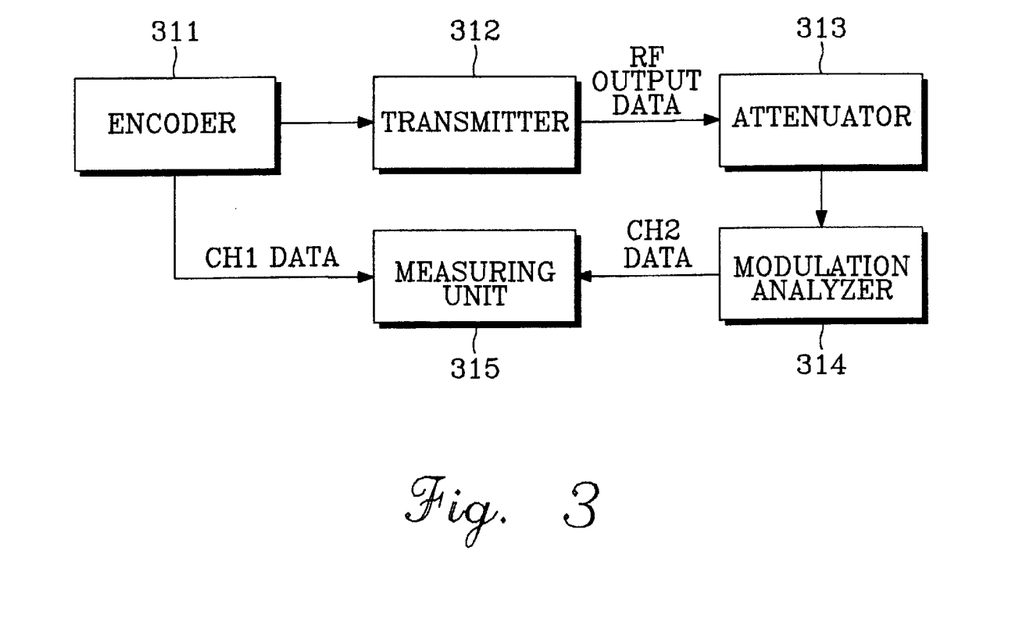
FIG. 3 is a schematic block diagram illustrating a preferred embodiment of a circuit for measurement of time delay in a transmitting signal in the mobile telecommunication system.

Referring now to FIG. 3, there is shown a preferred embodiment of a circuit for measurement of time delay in a transmitting signal for a transmitter of a base station in a typical mobile telecommunication system, for example, a paging system, in which circuit an encoder 311 is a signal generator serving as a terminal of the paging system, for generating paging data which is used in measuring a delay characteristic of a transmitter of a base station, which data is of a POCSAG form. A transmitter 312 receives the paging data via a transmission line or a radio link and converts the paging data from the encoder 311 into a radio frequency (RF) signal. An attenuator 313 attenuates the RF signal output to a predetermined value which is to be used in measuring the delay characteristic of transmitter 312. A modulation analyzer 314 serves to restore and analyze the attenuated output signal of the attenuator 313. A measuring unit 315, for instance, an oscilloscope compares a first channel of data form encoder 311 with a second channel of data from modulation analyzer 314 in order to measure the delay characteristic of transmitter 312. Accordingly, each base station will have plural cell sites and each cell site will have a delay characteristic of a corresponding transmitter stored in a corresponding controller (not shown) of each base station.

Figure 4:
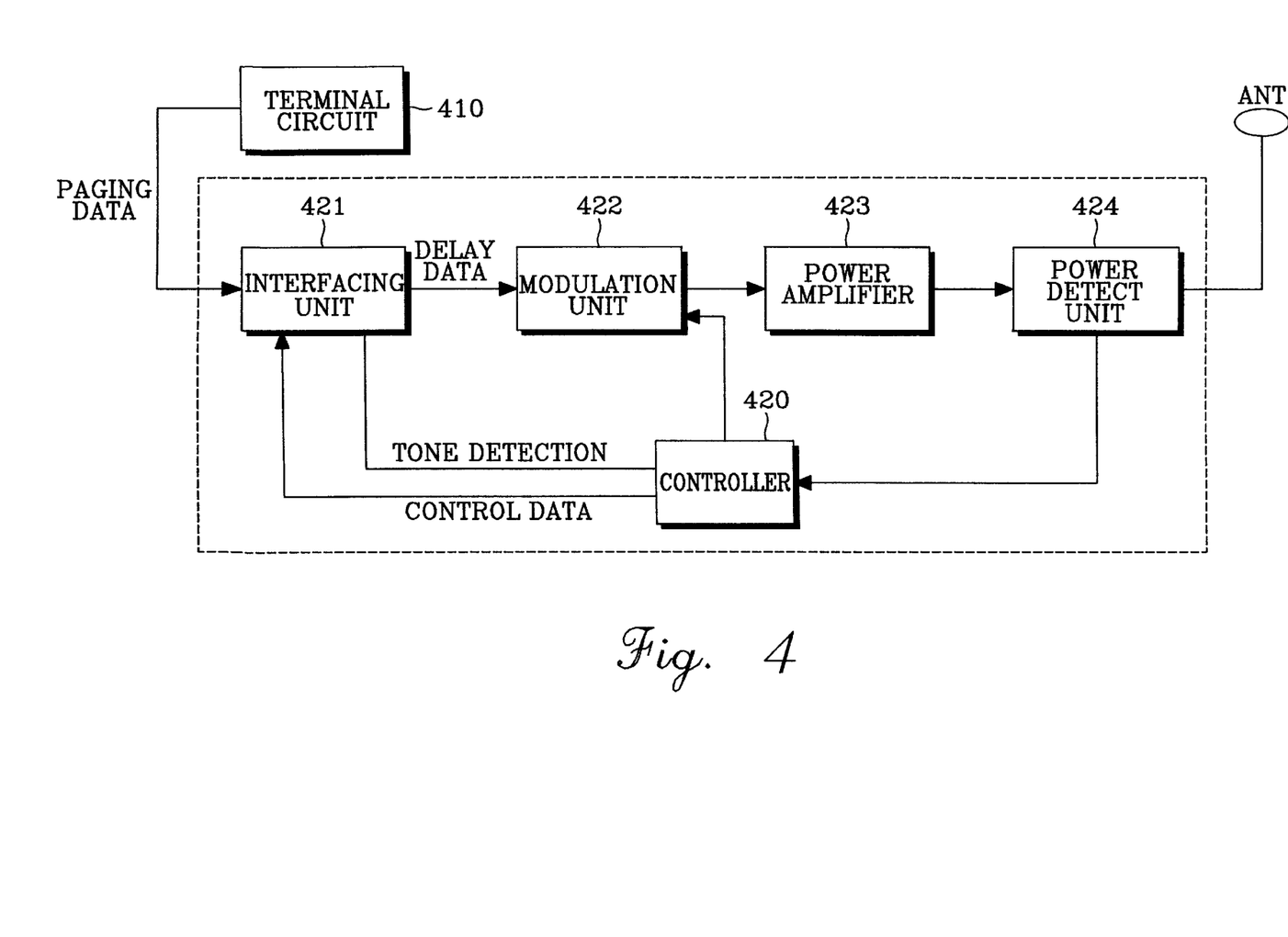
FIG. 4 is a schematic block diagram illustrating a preferred embodiment of a transmitter of the base station in the mobile telecommunication system according to the principles of the present invention.

FIG. 4 is a schematic block diagram illustrating a preferred embodiment of a transmitter of a base station according to the principles of the present invention. Referring to FIG. 4, a terminal circuit 410 serves as an output stage of the paging system for providing therefrom the paging data. A controller 420 controls the entire operation of the transmitter while receiving the delay characteristic information of the transmitter from a controller (not shown) of the base station and generates control data to control the time delay of the transmitter. An interfacing unit 421 includes therein a delaying unit (shown in FIG. 5) for delaying transmission of the paging data received from terminal circuit 410 in response to the control data from controller 420, in which the control data includes data for compensating for the time delay characteristic of a corresponding transmitter. The delaying unit of interfacing unit 421 compensates for the time delay characteristic upon receipt of the paging data and as a result, interfacing unit 421 provides delayed digital paging data to a frequency modulation unit 422 under control of the controller 420. Frequency modulation unit 422 receives the delayed paging data from interfacing unit 421 to perform modulation for transmission of a radio frequency under control of controller 420. A power amplifier 423 amplifies the modulated RF signal to a desired power level, which is delivered to a power detect unit 424 for detecting a power level of the amplified RF output signal. The power detect unit 424 is connected with the controller 420.

Referring to FIG. 4, it will be appreciated that transmission control of transmitters in a paging system is carried out such that a high quality of paging service can be obtained even in a reiteration cell area by means of appropriately compensating for any output delays of the paging data in accordance with a delay characteristic of each transmitter, thereby simulcasting the paging data outputs of the transmitters in the same channel. To achieve the above goal, interfacing unit 421 of the transmitter according to the present invention further includes therein a delaying unit for delaying the output of the paging data received in responsive to time delay control data from controller 420, which control data includes data to control the output characteristic of a corresponding transmitter.

Figure 5:
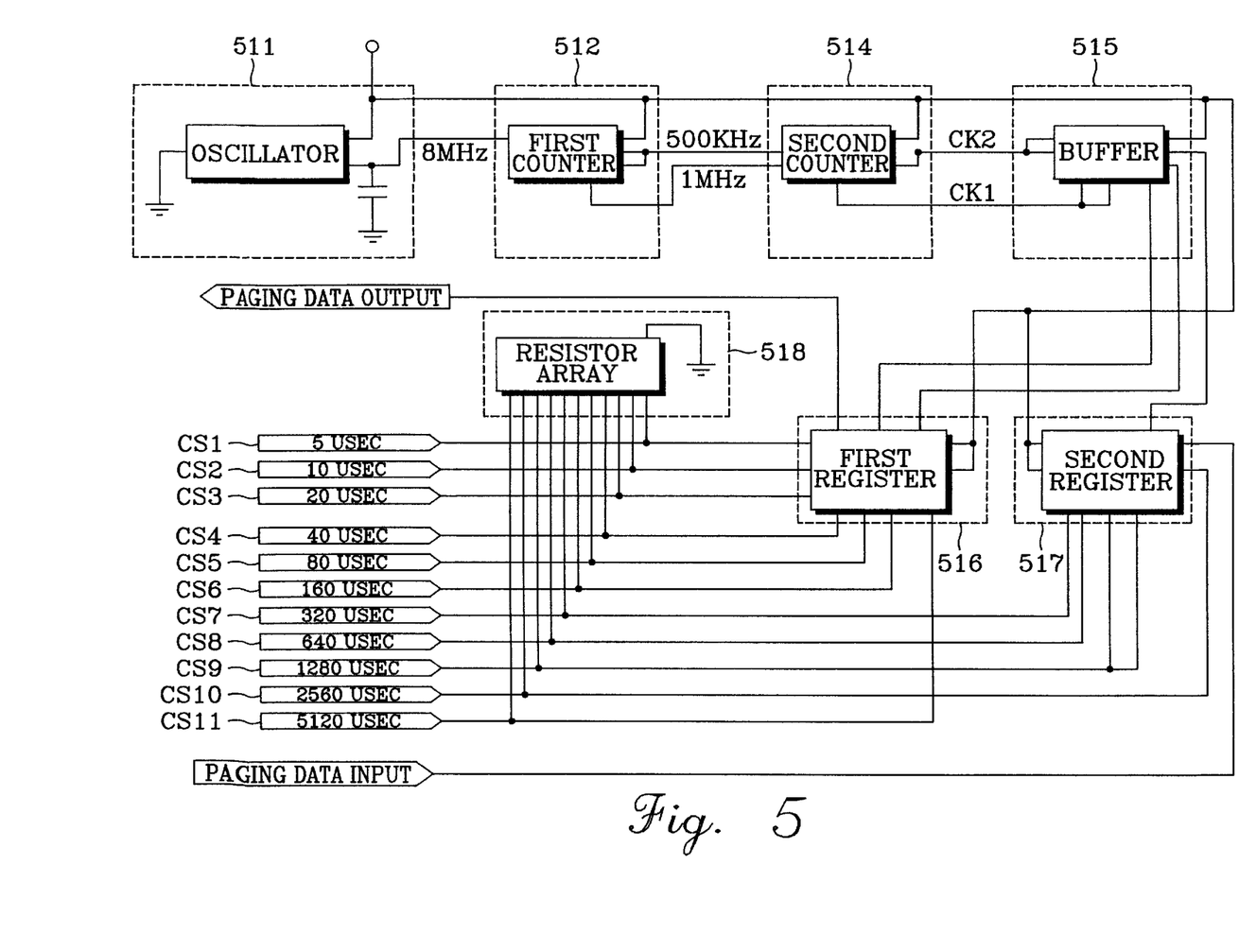
FIG. 5 is a schematic circuit diagram illustrating a preferred embodiment of a delaying unit for controlling the time delay of a paging signal in an interfacing circuit of FIG. 4.
Figure 6:
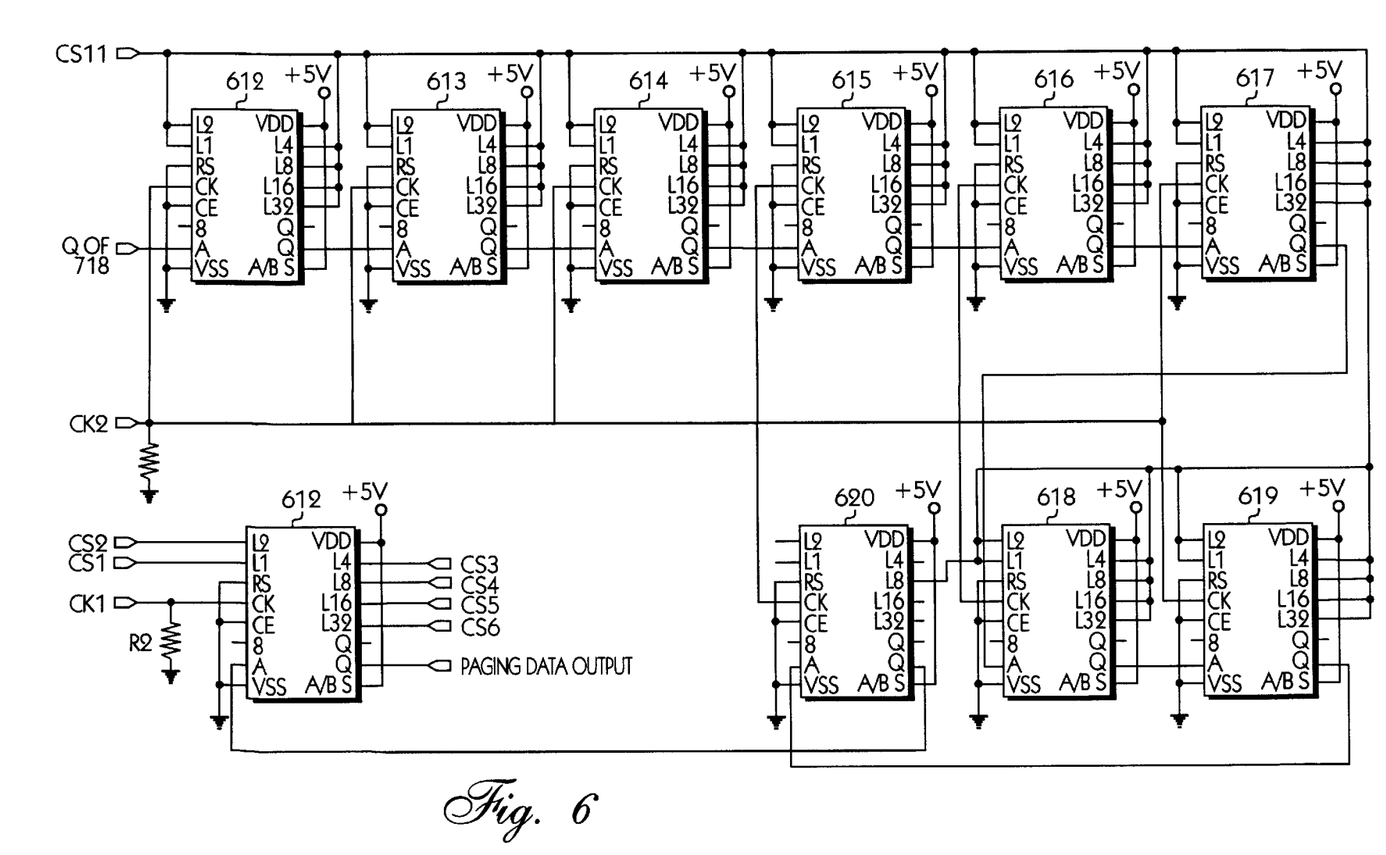
FIG. 6 is a schematic circuit diagram illustrating a preferred embodiment of a first register of FIG. 5.

Referring now to FIG. 5, a preferred embodiment of a delaying unit for controlling the time delay of a paging RF signal in interfacing unit 421 of FIG. 4 is shown. An oscillator 511 generates a reference clock which, in the preferred embodiment, has a frequency of 8 MHz. The 8 MHz output of oscillator 511 is smoothed by a 10-pF capacitor and is provided to a first counter 512. First counter 512 divides the reference clock from the oscillator to provide a set of frequency signals of 4 MHz, 2 Mhz, 1 Mhz, 500 kHz and 250 kHz. A second counter 514 having two quinary counters (not shown) serves to divide the 1 MHz and 500 kHz signals, respectively, of first counter 512 to provide a first delay clock CK1 of 200 kHz and a second delay clock CK2 of 100 kHz. A buffer 515 buffers the first delay clock CK1 of 200 kHz and the second delay clock CK2 of 100 kHz outputs of second counter 514, which are to be used as to control the output of the paging data via interfacing unit 421. According to the preferred embodiment, at least two delayed frequencies are generated (CK1 and CK2) so as to achieve a more efficient and precise delaying operation in the paging data output from the transmitter. First and second registers 516 and 517 are connected to output ports CS1–CS11 of controller 420 of FIG. 4, and second register 417 receives the paging data and passes it to first register 516 for output in response to control data output from output ports CS1–CS11 of controller 420. Controller 420 receives time delay control data from a control unit (not shown) of a base station to generate a set of control data, wherein the time delay control data from the control unit are those used for compensating for any particular delay characteristic of a given transmitter such as line delay or air delay which can be measured by means of the measuring unit 315 as shown in FIG. 3. In other words, the time delay control data may be the data for delaying an output timing point in a transmitter so that the corresponding transmitter can make the simulcasting of its output together with outputs of any other transmitters located within the cells of a base station. Assuming that the control data output by controller 420 in the above preferred embodiment according to the present invention is preferably made in multiples of 5-$\mu$sec and provided with at least 11 control ports, the maximum output delay of the paging data can be obtained by setting a total of 11 control ports in controller 420, thereby making such a time delay for a time period of 10,235 $\mu$sec. A resistor array 518 is connected to the output ports of the controller 420 to pull down logic levels of the same for attaining precise control signals. Each delay time of first register 516 and second register 517, which serve to delay the paging data output by the first delay clock CK1 of 200 kHz and the second delay clock CK2 of 100 kHz provided from the buffer 515, is set by the control signals from the controller 420. FIG. 6 illustrates a preferred embodiment of the first register 516, and FIG. 7 illustrates a preferred embodiment of the second register 517.

Figure 7:
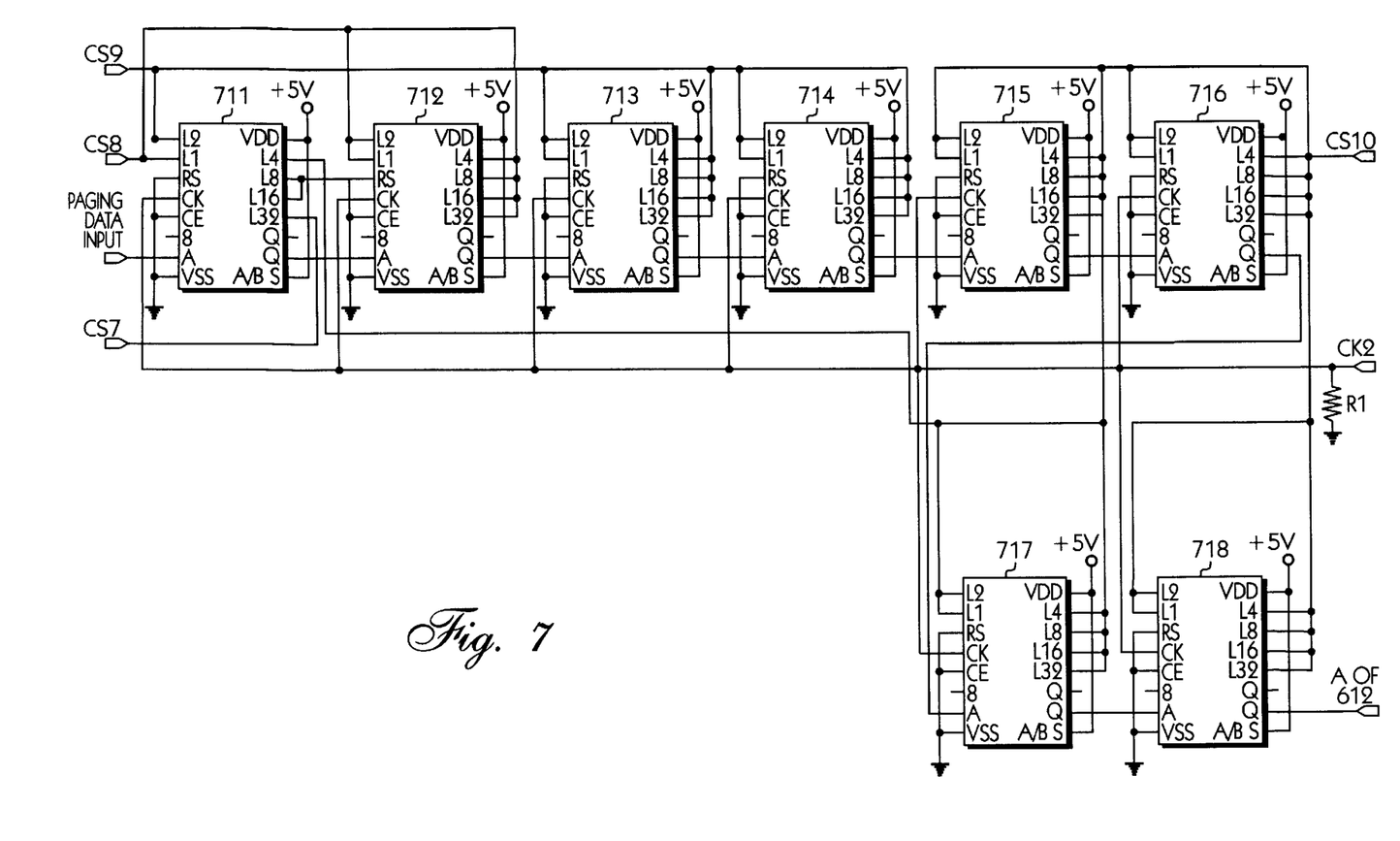
FIG. 7 is a schematic circuit diagram illustrating a preferred embodiment of a second register of FIG. 5.

Referring now to FIGS. 6 and 7, first register 516 includes registers 611–620, and second register 517 includes registers 711–718, all of which registers form a 1-to-64 bit variable length shift register, for which any kind of known shift register, for example, a commercial chip provided by the "Motorola" in a model number MC14557, may be used. The shift register may include a set of length control inputs L1, L2, L4, L8, L16 and L32, etc., which are respectively connected to the control signals from the controller 420 to obtain desired time delay values. In the above embodiment of the present invention, register 611 uses the first delay clock CK1 of 200 kHz for its shifting clock and the other registers 612–620 and 711–718 use the second delay clock CK2 of 100 kHz for their shifting clock. Accordingly, the register 611 has a delay time period of 320 $\mu$sec at the maximum, while the other registers 612–620 and 711–718 each have a delay time period of 640 $\mu$sec at the maximum.

Referring to the construction of register 611, first delay clock CK1 of 200 kHz is applied to its clock input CK, a control data CS1 for delaying the paging data by 5 $\mu$sec is coupled to length control input L1, control data CS2 for delaying the received paging data by 10 $\mu$sec is coupled to length control input L2, control data CS3 for delaying the paging data by 20 $\mu$sec is coupled to length control input L4, control data CS4 for delaying the paging data by 40 $\mu$sec is coupled to length control input L8, control data CS5 for delaying the paging data by 80 $\mu$sec is coupled to length control input L16, and control data CS6 for delaying the paging data by 160 $\mu$sec is coupled to length control input L32. Further, an input A of the register 611 is coupled to an output of register 620 and its output serves as an output terminal for outputting the delayed paging data. Thus, it is noted that as a result register 611 can delay the paging data by 315 $\mu$sec at the maximum according to the input status of the above control data, in which register 611 functions as a first delaying unit to set a first delay time period by loading only the control data CS6–CS1 of the aforementioned entire control data CS11–CS1, to delay the received paging data by 5 to 315 $\mu$sec with first delay clock CK1.

Referring now to the construction of register 711, second delay clock CK2 of 100 Khz is applied to its clock input CK, control data CS8 for delaying the paging data received by 640 $\mu$sec is coupled to length control input L1, control data CS9 for delaying the received paging data by 1280 $\mu$sec is coupled to length control input L2, control data CS10 for delaying the paging data by 2560 μsec is coupled to length control input L4, a ground signal is coupled to length control input L8 and length control input L16, and control data CS7 for delaying the paging data by 320 μsec is coupled to length control input L32. Further, an input A of register 711 is coupled to the paging data provided from paging terminal 410. Likewise, it is noted that as a result register 711 can delay the paging data by 320 μsec at the maximum according to the input status of the control data CS7.

Referring now to the construction of the register 712, second delay clock CK2 of 100 kHz is applied to its clock input CK, control data CS8 for delaying the received paging data by 640 μsec is coupled to its length control inputs L1–L32. Further, an input A of the register 712 is coupled to the output of register 711. Likewise, it is noted that as a result the register 712 can delay the paging data by 640 μsec at the maximum according to the input status of the control data CS8.

Referring now to the construction of the registers 713 and 714, second delay clock CK2 of 100 kHz is applied to each clock input CK, the control data CS9 for delaying the received paging data by 1280 μsec is coupled in common to their respective length control inputs L1–L32. Further, each input A of the registers 713 and 714 is coupled to the respective output of their preceding registers 712 and 713, while each output Q of the registers 713 and 714 is coupled to the respective A input of their following registers 714 and 715. Likewise, it is noted that as a result the registers 713 to 714 can delay the received paging data by 1280 μsec at the maximum according to the input status of the control data CS9.

Referring further to the construction of the registers 715 to 718, second delay clock CK2 of 100 kHz is applied to their respective clock input CK, the control data CS10 for delaying the received paging data by 2560 μsec is coupled in common to the length control inputs L1–L32. Further, each input A of the registers 715 to 718 is coupled to the respective output of their own preceding registers 714 and 717, while each output Q of the registers 715 to 717 is respectively coupled to the A inputs of their following registers 716 to 718, and the Q output of register 718 is coupled to the A input of register 612. Likewise, it is noted that the registers 715 to 718 can resultingly delay the paging data by 2560 μsec at the maximum according to the input status of the control data CS10.

Referring similarly to the circuit construction of the registers 612 to 619, second delay clock CK2 of 100 kHz is applied to their respective clock input CK, the control data CS11 for delaying the received paging data by 5120 μsec is coupled in common to the length control inputs L1–L32. Further, each input A of the registers 613 to 619 is coupled to the respective Q output of their own preceding registers 612 to 618, while each Q output of registers 612 to 619 is coupled to the respective A input of their own following registers 613 to 620. Likewise, it is noted that the registers 612 to 619 can resultingly delay the paging data by 5120 μsec at the maximum according to the input status of the control data CS11.

The above registers 612 to 620 and 711 to 718 function as a second delaying unit to set a second delay time period by loading only the control data CS1–CS7 of the aforementioned entire control data CS11–CS1, thereby enabling to delay the received paging data by 320 μsec to 9980 μsec with the second delay clock CK2. Register 611 forms a first delay unit.

Referring again to FIGS. 6 and 7, the delaying operation of the paging data according to the principles of the present invention is described hereinafter, in which the paging data is delayed in a 5 μsec unit by using the first delay clock CK1 of 200 kHz and also delayed in a 10 μsec unit by using the second delay clock CK2 of 100 kHz. Here, register 611 uses the first delay clock CK1, while the remaining registers 612 to 619 and 711 to 718 use the second delay clock CK2. Also, the paging data output through registers 612 to 619 and 711 to 718 is basically delayed by 175 μsec with no control signals set due to the intrinsic delay of the signal passing through the registers. Now, it is assumed that the control data signals CS1–CS11 provided from the controller 420 are adapted to cause delays have the following values:

| | |
|---|---|
| CS1 = 5 μsec | CS2 = 10 μsec |
| CS3 = 20 μsec | CS4 = 40 μsec |
| CS5 = 80 μsec | CS6 = 160 μsec |
| CS7 = 320 μsec | CS8 = 640 μsec |
| CS9 = 1280 μsec | CS10 = 2560 μsec |
| CS11 = 5120 μsec | |

According to the preferred embodiment of the present invention, when the delay value of the paging data is equal to or less than 315 μsec, it is controlled the control data signals CS1–CS6 applied to register 611, when the delay value of the paging data is a value between 320 μsec and 635 μsec, it is then controlled the control data signals CS1–CS7 applied to the registers 611 and 711. Various delay characteristic of the paging data according to the corresponding control data CS1–CS11 is shown in the following table.

TABLE

| CS1–CS11 | DELAY TIME (μsec) | STATUS |
|---|---|---|
| 00000000000 | 0 | Reset L32 - L1 of Register 611 |
| 00000000001 | 5 | Set L1 of Register 611 |
| 00000000010 | 10 | Set L2 of Register 611 |
| 00000000011 | 15 | Set L2 & L1 of Register 611 |
| 00000000100 | 20 | Set L4 of Register 611 |
| 00000000101 | 25 | Set L4 & L1 of Register 611 |
| 00000000110 | 30 | Set L4 & L2 of Register 611 |
| 00000000111 | 35 | Set L4, L2 & L1 of Register 611 |
| 00000001000 | 40 | Set L8 of Register 611 |
| 00000001001 | 45 | Set L8 & L1 of Register 611 |
| 00000001010 | 50 | Set L8 & L2 of Register 611 |
| 00000001011 | 55 | Set L8, L2 & L1 of Register 611 |
| 00000001100 | 60 | Set L8 & L4 of Register 611 |
| 00000001101 | 65 | Set L8, L4 & L1 of Register 611 |
| 00000001110 | 70 | Set L8, L4 & L2 of Register 611 |

TABLE-continued

| CS1–CS11 | DELAY TIME (μsec) | STATUS |
|---|---|---|
| 00000001111 | 75 | Set L8, L4, L2 & L1 of Register 611 |
| 00000010000 | 80 | Set L16 of Register 611 |
| 00000010001 | 85 | Set L16 & L1 of Register 611 |
| 00000010010 | 90 | Set L16 & L2 of Register 611 |
| 00000010011 | 95 | Set L16, L2 & L1 of Register 611 |
| 00000010100 | 100 | Set L16 & L4 of Register 611 |
| 00000010101 | 105 | Set L16, L4 & L1 of Register 611 |
| 00000010110 | 110 | Set L16, L4 & L2 of Register 611 |
| 00000010111 | 115 | Set L16, L4, L2 & L1 of Register 611 |
| 00000011000 | 120 | Set L16 & L8 of Register 611 |
| 00000011001 | 125 | Set L16, L8 & L1 of Register 611 |
| 00000011010 | 130 | Set L16, L8 & L2 of Register 611 |
| 00000011011 | 135 | Set L16, L8, L2 & L1 of Register 611 |
| 00000011100 | 140 | Set L16, L8 & L4 of Register 611 |
| 00000011101 | 145 | Set L16, L8, L4 & L1 of Register 611 |
| 00000011110 | 150 | Set L16, L8, L4 & L2 of Register 611 |
| 00000011111 | 155 | Set L16, L8, L4, L2 & L1 of Register 611 |
| 00000100000 | 160 | Set L32 of Register 611 |
| 00000100001 | 165 | Set L32, L2 & L1 of Register 611 |
| 00000100010 | 170 | Set L32 & L2 of Register 611 |
| 00000100011 | 175 | Set L32, L2 & L1 of Register 611 |
| 00000100100 | 180 | Set L32 & L4 of Register 611 |
| 00000100101 | 185 | Set L32, L4 & L1 of Register 611 |
| 00000100110 | 190 | Set L32, L4 & L2 of Register 611 |
| 00000100111 | 195 | Set L32, L4, L2 & L1 of Register 611 |
| 00000101000 | 200 | Set L32 & L8 of Register 611 |
| 00000101001 | 205 | Set L32, L8 & L1 of Register 611 |
| 00000101010 | 210 | Set L32, L8 & L2 of Register 611 |
| 00000101011 | 215 | Set L32, L8, L2 & L1 of Register 611 |
| 00000101100 | 220 | Set L32, L8 & L4 of Register 611 |
| 00000101101 | 225 | Set L32, L8, L4 & L1 of Register 611 |
| 00000101110 | 230 | Set L32, L8, L4 & L2 of Register 611 |
| 00000101111 | 235 | Set L32, L8, L4, L2 & L1 of Register 611 |
| 00000110000 | 240 | Set L32 & L16 of Register 611 |
| 00000110001 | 245 | Set L32, L16 & L1 of Register 611 |
| 00000110010 | 250 | Set L32, L16 & L2 of Register 611 |
| 00000110011 | 255 | Set L32, L16, L2 & L1 of Register 611 |
| 00000110100 | 260 | Set L32, L16 & L4 of Register 611 |
| 00000110101 | 265 | Set L32, L16, L4 & L1 of Register 611 |
| 00000110110 | 270 | Set L32, L16, L4 & L2 of Register 611 |
| 00000110111 | 275 | Set L32, l16, L4, L2 & L1 of Register 611 |
| 00000111000 | 280 | Set L32, L16 & L8 of Register 611 |
| 00000111001 | 285 | Set L32, L16, L8 & L1 of Register 611 |
| 00000111010 | 290 | Set L32, L16, L8 & L2 of Register 611 |
| 00000111011 | 295 | Set L32, L16, L8, L2 & L1 of Register 611 |
| 00000111100 | 300 | Set L32, L16, L8 & L4 of Register 611 |
| 00000111101 | 305 | Set L32, L16, L8, L4 & L1 of Register 611 |
| 00000111110 | 310 | Set L32, L16, L8, L4 & L2 of Register 611 |
| 00000111111 | 315 | Set L32, L16, L8, L4, L2 & L1 of Register 611 |
| 00001000000 | 320 | Set L32 of Register 711 |
| 00001000001 | 325 | Set L32 of Register 711 & L1 of Register 611 |
| 00001000010 | 330 | Set L32 of Register 711 & L2 of Register 611 |
| 00001000011 | 335 | Set L32 of Register 711 & L2, L1 of Register 611 |
| 00001000100 | 340 | Set L32 of Register 711 & L4 of Register 611 |

Therefore, in view of the foregoing description, it is well appreciated that according to the respective output status of the control data CS1–CS11 the paging data are delayed by a given time period as seen in the above TABLE, which incorporates by reference the results of delaying operation for the control data CS1–CS7 only for the sake of convenience. However, it will be also appreciated that the results of such a delaying operation for the remaining control data CS8–CS11 are to be obtained with ease in a similar manner. For instance, in case the delay time value of the paging data is a value between 640 μsec and 1275 μsec, the control data CS1–CS8 applied to registers 611 and 711–712 are to be controlled in the present embodiment circuit. Likewise, in case the delay time value of the paging data is a value between 1280 μsec and 2555 μsec, the control data CS1–CS9 applied to registers 611 and 711–714 are controlled, while in case the delay time value of the paging data is a value between 2560 μsec and 5115 μsec, the control data CS1–CS10 applied to registers 611 and 711–718 are controlled. Additionally, in case the delay time value of the paging data is a value in between 5120 μsec and 10235 μsec, the control data CS1–CS11 applied to registers 611–619 and 711–718 are to be controlled in the present invention.

Figure 8:
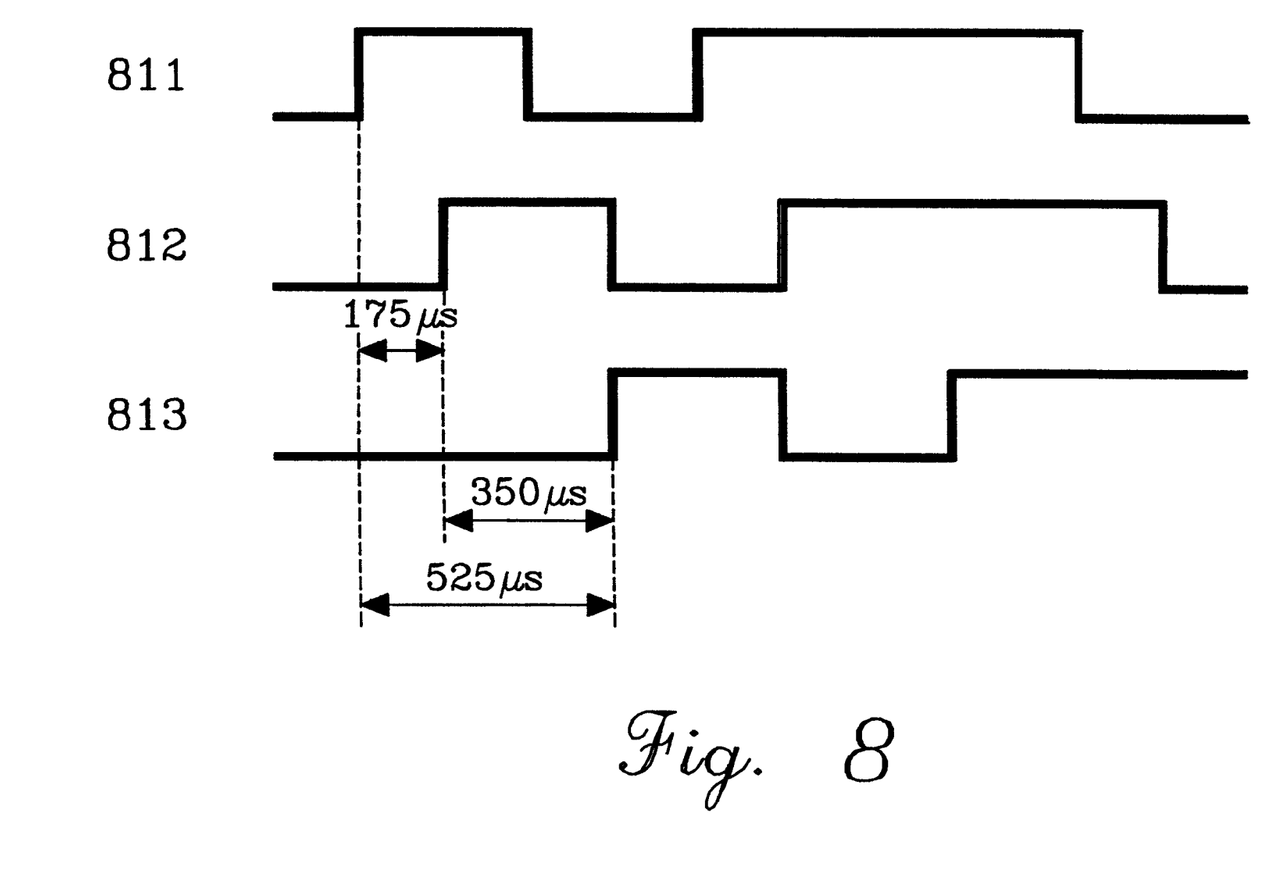
FIGS. 8 is a waveform diagram illustrating the delaying characteristic of the transmitting signal in the respective registers as set forth in FIGS. 6 and 7.

Referring now to FIG. 8, the waveform diagrams illustrate the delaying characteristic of the input paging data and the output paging data in the first and second registers 516 and 517 as set forth in FIG. 5. The waveform 811 represents the input paging data applied to the interfacing unit 421 from the paging terminal 410, which paging data are provided to the input A of the register 711. Here, assuming that the delay control data CS11–CS1 provided from the controller 420 is "00001000110" in binary value, the ports L4 and L2 of the register 611 and the port L32 are caused to be "Set" and all the other ports of the registers are to be "Reset", in which case the paging data is delayed by 320 μsec via the register 711 and also delayed by 30 μsec via the register 611. In addition to these delays, a further intrinsic delay is caused by the circuit construction itself including those 18 registers 611 to 620 and 711 to 718 used in the preferred embodiment, which delay reaches about 175 μsec in total as shown in the waveform 812. As a result, the entire delay time of the delayed paging data finally provided from the register 611 amounts to 525 μsec, which is a sum of the intrinsic delay 175 μsec and the aforementioned total register delay 350 μsec, as seen in the waveform 813.

As stated hereinbefore, the present invention can measure the output delay characteristic of transmitters in a mobile telecommunication system such as a paging system and control the outputs of the transmitters in accordance with the results of the measurement, so that a simulcasting of radio frequency outputs for the transmitters of the same channel in any reiteration cell area is effectively achieved, thereby allowing a subscriber in the reiteration cell area to enjoy a better quality of service without any interruption as well as more stable service of mobile telecommunication system.

Although the present invention has been described with reference to the preferred embodiments thereof, those skilled in the art will readily appreciate that various substitutions and modifications can be made thereto without departing from the spirit and scope of the invention as set forth in the appended claims.

What is claimed is:

1. A simulcasting transmitter control apparatus for use in a base station of a mobile telecommunication system, said base station being provided with a plurality of transmitters each having its own delay characteristic and with a base station control unit providing a set of control data, said control data being usable in simulcasting of a multiplicity of radio frequency signals of the same channel in a reiteration cell area in which outputs of said transmitters are overlapped to each other in a certain area, said simulcasting transmitter control apparatus comprising:

means for inputting said control data;

means for generating a reference clock;

means for generating a plurality of delayed clocks divided from said reference clock; and delay means responsive said control data for delaying a transmission of paging data to a paging receiver by setting a delay time period in accordance with said control data in synchronization with said delayed clocks, so that the simulcasting of said multiplicity of radio frequency signals of the same channel in the reiteration cell area is carried out in said plurality of transmitters.

2. The simulcasting transmitter control apparatus according to claim 1, wherein said means for inputting said control data comprises a controller for controlling the entire operation of said transmitter, receiving the control data from said control unit of the base station, said delay time period of said delay unit compensating for the delay characteristic of said transmitters, and therefrom generating a control signal to control the time delay for the outputs of the respective transmitter.

3. The simulcasting transmitter control apparatus according to claim 2, further comprised of an interfacing unit including a delaying circuit unit for delaying transmission of the paging data received thereto responsive to the control signal from said controller.

4. The simulcasting transmitter control apparatus according to claim 3, further comprised of a frequency modulation unit coupled to said interfacing unit, for modulating the delayed paging signal under control of said controller.

5. A simulcasting transmitter control apparatus for use in a base station of a mobile telecommunication system, said base station being provided with a plurality of transmitters each having its own delay characteristic and with a base station control unit providing a plurality of control data, said simulcasting transmitter control apparatus comprising:

a unit for inputting said control data, said control data being usable in simulcasting of a multiplicity of radio frequency signals of the same channel in a reiteration cell area in which outputs of said transmitters are overlapped to each other in a certain area;

a unit for generating a reference clock;

a unit for generating first and second delayed clocks divided from said reference clock;

a first delay unit for receiving said control data from said base station control unit, setting a first delay time period in accordance with a given one of said control data, and delaying outputting of paging data from said transmitters of the base station by said first delay time period in synchronization with said first delayed clock; and a second delay unit operable in association with said first delay unit, for receiving said control data from said base station control unit, setting a second delay time period in accordance with another given one of said control data, and delaying outputting of the paging data from said transmitters by said second delay time period in synchronization with said second delayed clock, whereby the simulcasting of said multiplicity of paging data signals of the same channel in the reiteration cell area is carried out in said plurality of transmitters.

6. The simulcasting transmitter control apparatus according to claim 5, further comprised of an interfacing unit including a delaying circuit unit for generating said first delayed clock and said second delayed clock.

7. The simulcasting transmitter control apparatus according to claim 5, wherein a frequency of said first delayed clock is higher than that of said second delayed clock.

8. A method for controlling simulcasting of paging information over a same channel from each of a plurality of transmitters, each having its own delay characteristic, associated with a common base station of a mobile telecommunication system, said method comprising the steps of:

comparing a first channel of paging data from an encoder of said base station to a second channel of paging data from said transmitter to measure a delay characteristic of said transmitter;

generating control data for controlling said transmitter, said control data including time delay control data, generated in response to said delay characteristic of said transmitter, for controlling a time delay of said transmitter;

generating a reference clock signal;

dividing said reference clock signal to generate a first clock signal and a second clock signal, said first and second clock signals each being different from each other and less than a frequency of said reference clock signal;

dividing said first clock signal to generate a first delayed clock signal having a frequency less than said first clock signal;

dividing said second clock signal to generate a second delayed clock signal having a frequency less than said second clock signal;

storing paging data from said base station into a first variable length shift register in response to said second delayed clock and delaying the output of said paging data from said first variable shift register in response to said time delay control data; and storing delayed paging data output from said first variable shift register into a second variable length shift register in response to said second delayed clock and delaying the output of said paging data from said second variable shift register in response to said time delay control data and said first delayed clock, the output of said paging data from said second variable shift register being provided to said transmitter.

* * * * *